(12) United States Patent
Shoji

(10) Patent No.: US 12,549,211 B2
(45) Date of Patent: Feb. 10, 2026

(54) RECEPTION APPARATUS TO RECEIVE SIGNALS USING CIRCUIT CURRENT CONSUMPTION, COMMUNICATION SYSTEM, AND METHOD FOR CONTROLLING RECEPTION APPARATUS

(71) Applicant: CANON KABUSHIKI KAISHA, Tokyo (JP)

(72) Inventor: Yuki Shoji, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 368 days.

(21) Appl. No.: 18/316,568

(22) Filed: May 12, 2023

(65) Prior Publication Data

US 2023/0370103 A1 Nov. 16, 2023

(30) Foreign Application Priority Data

May 16, 2022 (JP) .................... 2022-080425

(51) Int. Cl.
*H04B 1/12* (2006.01)
*H03F 3/19* (2006.01)

(52) U.S. Cl.
CPC ............... *H04B 1/12* (2013.01); *H03F 3/19* (2013.01)

(58) Field of Classification Search
CPC ................................. H04B 1/12; H03F 3/19
See application file for complete search history.

(56) References Cited

U.S. PATENT DOCUMENTS

2015/0311932 A1* 10/2015 Fujii ................. H04L 25/03885
375/233
2023/0063376 A1* 3/2023 Kim ..................... H04L 27/2636

FOREIGN PATENT DOCUMENTS

JP 2005159480 A 6/2005

* cited by examiner

*Primary Examiner* — Junpeng Chen
(74) *Attorney, Agent, or Firm* — Canon U.S.A., Inc. IP Division

(57) ABSTRACT

A reception apparatus includes a reception circuit configured to receive reception signals, and a control circuit configured to control the reception signals to be input to the reception circuit by executing a feedback control according to a current consumption of the reception circuit.

16 Claims, 17 Drawing Sheets

RECEPTION APPARATUS TO RECEIVE SIGNALS USING CIRCUIT CURRENT CONSUMPTION, COMMUNICATION SYSTEM, AND METHOD FOR CONTROLLING RECEPTION APPARATUS

BACKGROUND

Technical Field

The present disclosure relates to a reception apparatus, a communication system, and a method for controlling the reception apparatus.

Description of the Related Art

In recent years, increasing number of production systems and robotic apparatuses are attached with an apparatus for communicating a large volume of data, such as a camera, to perform non-contact high-speed data transmission between a mechanical moving unit and a fixed unit. Japanese Patent Application Laid-Open No. 2005-159480 discusses a non-contact data communication apparatus having coupling electrodes for performing data communication and non-coupling electrodes for receiving spatial noise. The non-contact data communication apparatus amplifies the difference between the voltages generated between two electrodes and subtracts spatial noise from a reception data signal containing spatial noise, thus improving the quality of the reception signal.

With the recent increase in the amount of data within and between apparatuses, there has been a demand for the implementation of high-speed communication in wireless communication systems. Japanese Patent Application Laid-Open No. 2005-159480 implements wireless communication through electromagnetic field coupling by using two different reception electrodes. However, the electromagnetic field intensity of spatial noise is higher than the signal amplitude. In the data communication apparatus discussed in Japanese Patent Application Laid-Open No. 2005-159480, when an input voltage exceeds the input dynamic range of a differential amplifier for amplifying the difference between the voltages generated at the two electrodes, it becomes difficult to suitably perform processing for subtracting spatial noise, possibly remarkably degrading the quality of the reception data signal.

The present disclosure is directed to fitting a reception signal into the input dynamic range of a reception circuit even if noise occurs.

SUMMARY

According to an aspect of the embodiments, a reception apparatus includes a reception circuit configured to receive reception signals, and a control circuit configured to control the reception signals to be input to the reception circuit by executing a feedback control according to a current consumption of the reception circuit.

Further features of the disclosure will become apparent from the following description of exemplary embodiments with reference to the attached drawings.

DESCRIPTION OF THE EMBODIMENTS

Figure 1:
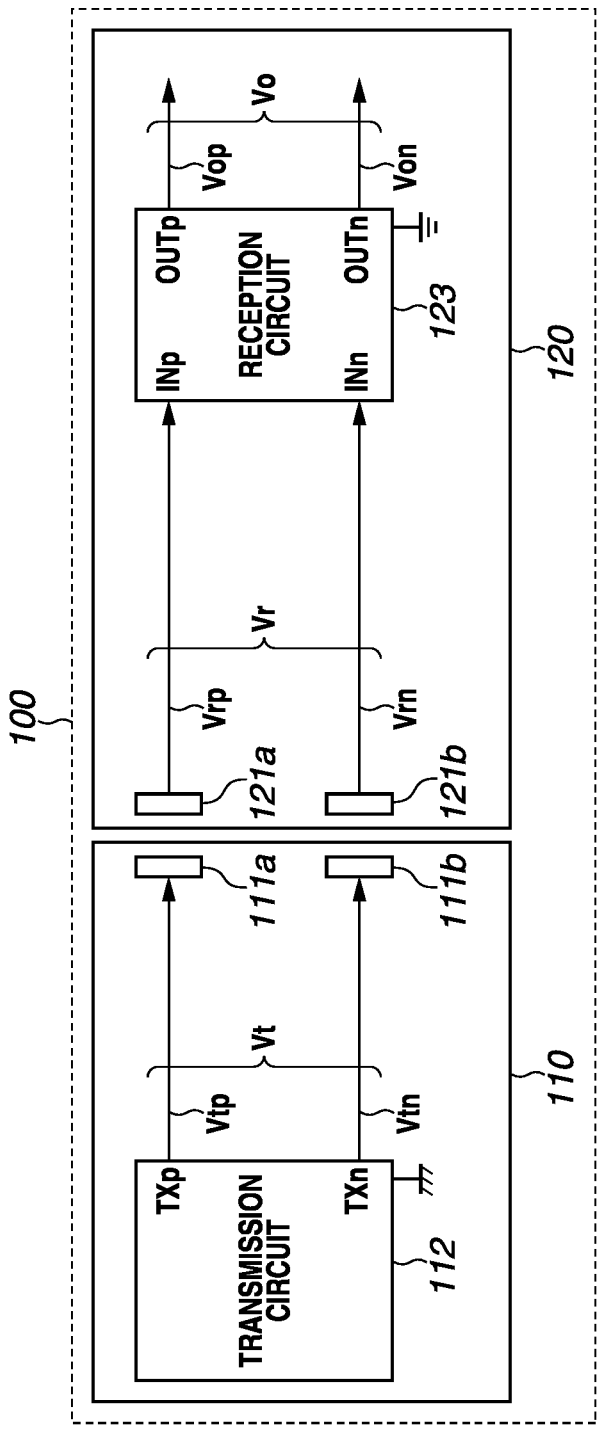
FIG. 1 is a block diagram illustrating an example basic configuration of a communication system.

In the following, the term "unit" may have different meanings depending on the context. The usual meaning is an individual element, single and complete. The phrase "units of" may refer to a plurality of elements or a group of elements. In addition, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described in the following or above. In addition, the term "element," "assembly," "component," or "device" may also refer to "circuit" with or without integration with packaging materials. Furthermore, depending on the context, the term "portion," "part," "device," "switch," or similar terms may refer to a circuit or a group of circuits. The circuit or group of circuits may include electronic, mechanical, or optical elements such as capacitors, diodes, transistors. For example, a switch is a circuit that turns on and turns off a connection. It can be implemented by a transistor circuit or similar electronic devices. FIG. 1 is a block diagram illustrating an example basic configuration of a communication system 100 according to a first exemplary embodiment. Basic operations of the communication system 100 will be described below with reference to FIG. 1. The communication system 100 performs data communication between adjacent electrodes 111a, 111b, 121a, and 121b through electric field or magnetic field coupling. The electrodes 111a and 121a are a coupler mutually coupled by electric field or magnetic field. The electrodes 111b and 121b are also a coupler mutually coupled by electric field or magnetic field. The communication system 100 includes a transmission unit or circuit assembly 110 and a reception unit or circuit assembly 120.

Figure 2:
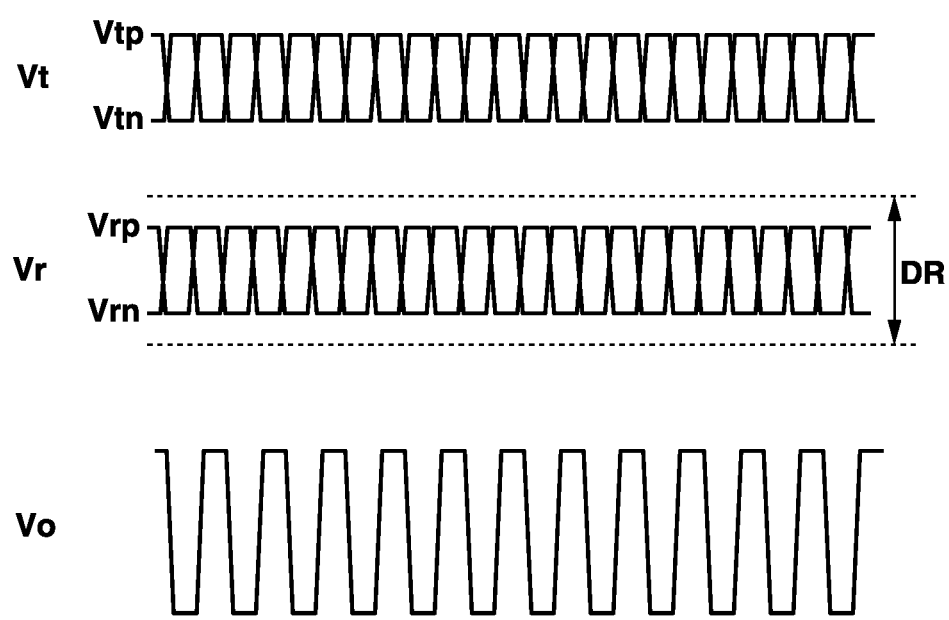
FIG. 2 illustrates time waveforms of different portions in the communication system.

The transmission unit 110 includes the electrodes 111a and 111b and a transmission circuit 112. The transmission circuit 112 outputs a transmission signal $V_t$. An output terminal TXp of the transmission circuit 112 outputs a transmission voltage $V_{tp}$ to the electrode 111a. An output terminal TXn of the transmission circuit 112 outputs a transmission voltage $V_{tn}$ to the electrode 111b. As illustrated in FIG. 2, the transmission voltages $V_{tp}$ and $V_{tn}$ are differential signals in reverse phase. The transmission signal $V_t$ is a voltage as the difference between the transmission voltage $V_{tn}$ and the transmission voltage $V_{tp}$, ($V_{tp}-V_{tn}$). The electrode 111a wirelessly transmits the transmission voltage (transmission power) $V_{tp}$ to the electrode 121a through electric field or magnetic field coupling. The electrode 111b wirelessly transmits the transmission voltage (transmission power) $V_{tn}$ to the electrode 121b through electric field or magnetic field coupling.

The reception unit 120 includes the electrodes 121a and 121b and a reception circuit 123. The electrode 121a generates a reception voltage $V_{rp}$ corresponding to the transmission voltage $V_{tp}$. The electrode 121b generates a reception voltage $V_{rn}$ corresponding to the transmission voltage $V_{tn}$. As illustrated in FIG. 2, the reception voltages $V_{rp}$ and $V_{rn}$ are differential signals in reverse phase. A reception signal $V_r$ is a voltage as the difference between the reception voltage $V_{rn}$ and the reception voltage $V_{rp}$, ($V_{rp}-V_{rn}$).

The reception circuit 123 receives the reception signal $V_r$. It amplifies the reception signal $V_r$ or subjects the signal to the impedance transformation, and outputs an output signal $V_o$. An input terminal INp of the reception circuit 123 inputs the reception voltage $V_{rp}$ An input terminal INn of the reception circuit 123 inputs the reception voltage $V_{rn}$. An output terminal OUTp of the reception circuit 123 outputs an output voltage $V_{op}$. An output terminal OUTn of the reception circuit 123 outputs an output voltage $V_{on}$. The output voltages $V_{op}$ and $V_{on}$ are differential signals in reverse phase. The output signal $V_o$ is a voltage as the difference between the output voltage $V_{on}$ and the output voltage $V_{op}$, ($V_{op}-V_{on}$).

FIG. 2 illustrates examples of voltage waveforms of the transmission signal $V_t$, the reception signal $V_r$, and the output signal $V_o$ in FIG. 1. The transmission signal $V_t$ is a voltage as the difference between the transmission voltage $V_{tn}$ and the transmission voltage $V_{tp}$, ($V_{tp}-V_{tn}$). The reception signal $V_r$ is a voltage as the difference between the reception voltage $V_{rn}$ and the reception voltage $V_{rp}$, ($V_{rp}-V_{rn}$). The output signal $V_o$ is a voltage as the difference between the output voltage $V_{on}$ and the output voltage $V_{op}$, ($V_{op}-V_{on}$).

The reception voltages $V_{rp}$ and $V_{rn}$ do not contain spatial noise. Therefore, the reception voltages $V_{rp}$ and $V_{rn}$ have waveforms similar to the waveforms of the transmission voltages $V_{tp}$ and $V_{tn}$, respectively. If the transmission circuit 112 is set to output the transmission voltages $V_{tp}$ and $V_{tn}$ having a constant amplitude, the reception voltages $V_{rp}$ and $V_{rn}$ do not exceed the input dynamic range DR of the reception circuit 123, enabling stable communication of the communication system 100.

Figure 3:
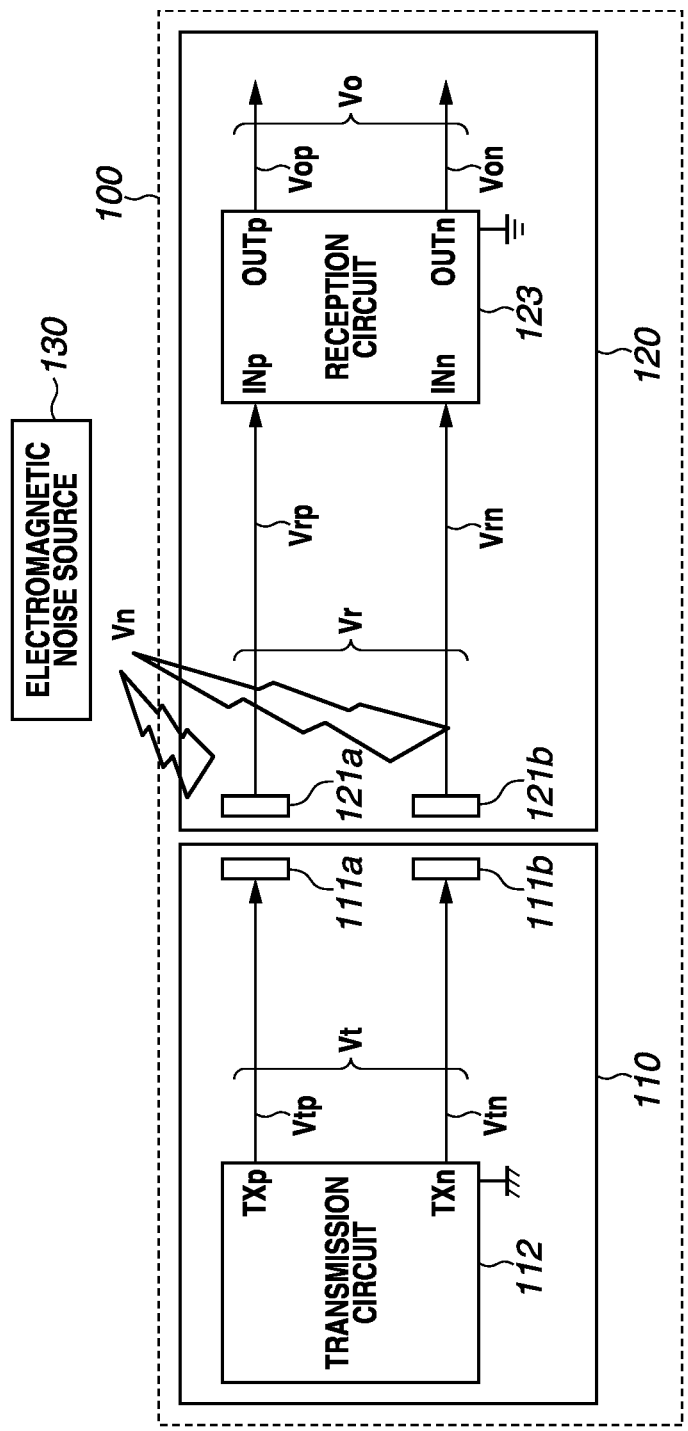
FIG. 3 is another block diagram illustrating an example basic configuration of the communication system.
Figure 4:
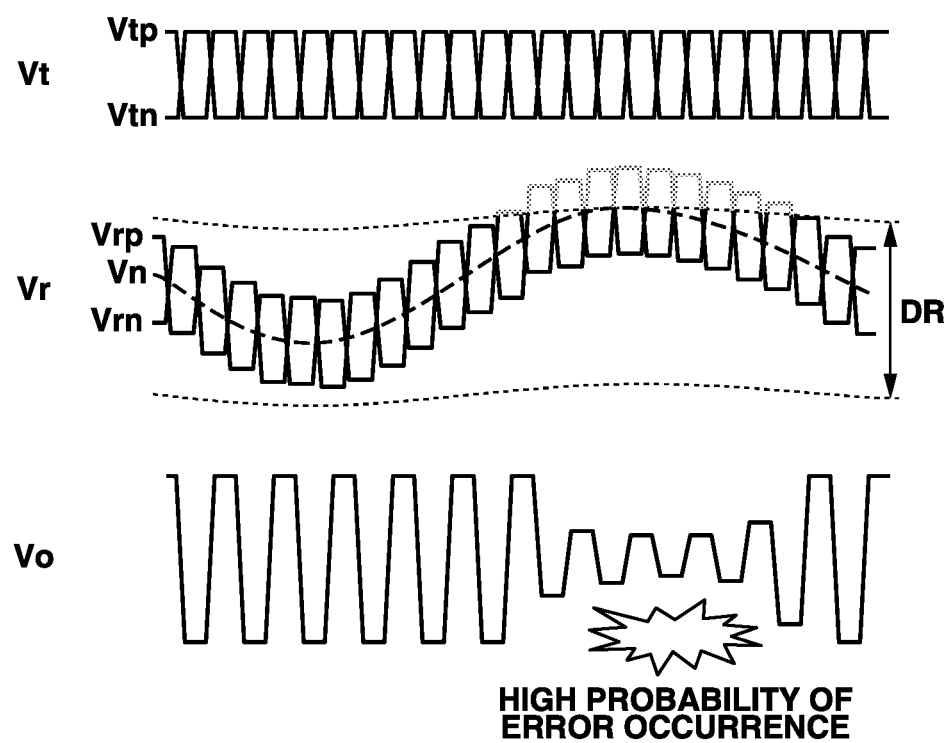
FIG. 4 illustrates time waveforms of different portions in the communication system.

FIG. 3 is a block diagram illustrating an electromagnetic noise source 130 and an example basic configuration of the communication system 100. FIG. 3 includes the electromagnetic noise source 130 as an additional unit to the block diagram in FIG. 1. The electromagnetic noise source 130 generates a noise voltage $V_n$. Spatial noise based on the noise voltage $V_n$ is mixed in the reception voltages $V_{rp}$ and $V_{rn}$. The noise voltage $V_n$ is mixed in the reception voltages $V_{rp}$ and $V_{rn}$ in the form of an electromagnetic wave propagating through the space or a variation of the reference potential (ground potential). Assume a case where the physical distance between the electrodes 121a and 121b is sufficiently short with respect to the wavelength (frequency) of the noise voltage $V_n$. In this case, the phases and frequencies of the reception voltages $V_{rp}$ and $V_{rn}$ almost synchronize with the phase and frequency of the noise voltage $V_n$, as illustrated in FIG. 4. It is assumed that spatial noise having a reduced amplitude is mixed in the reception voltages $V_{rp}$ and $V_{rn}$. More specifically, spatial noise similar to the noise voltage $V_n$ is mixed in the reception voltages $V_{rp}$ and $V_{rn}$.

FIG. 4 illustrates examples of voltage waveforms of the transmission signal $V_t$, the reception signal $V_r$, and the output signal $V_o$ in FIG. 3. The transmission signal $V_t$ is a voltage as the difference between the transmission voltage $V_{tn}$ and the transmission voltage $V_{tp}$, ($V_{tp}-V_{tn}$). The reception signal $V_r$ is a voltage as the difference between the reception voltage $V_{rn}$ and the reception voltage $V_{rp}$, ($V_{rp}-V_{rn}$). The output signal $V_o$ is a voltage as the difference between the output voltage $V_{on}$ and the output voltage $V_{op}$, ($V_{op}-V_{on}$).

Referring to FIG. 4, the reception voltages $V_{rp}$ and $V_{rn}$ are formed such that spatial noise based on the noise voltage $V_n$ is superimposed on the reception voltages $V_{rp}$ and $V_{rn}$ in FIG. 2. If the reception voltages $V_{rp}$ and $V_{rn}$ exceed the input dynamic range DR of the reception circuit 123 at a certain timing, a distortion arises in the output signal $V_o$. As a result, the signal quality of the output signal $V_o$ degrades, increasing the probability that a data error occurs.

To restrict such a signal quality degradation of the output signal $V_o$, it is desirable to pre-estimate the maximal value of spatial noise based on the noise voltage $V_n$ which may be mixed in, and design the reception circuit 123 having a sufficiently large input dynamic range DR with respect to the maximal value of spatial noise. However, it is generally difficult to design the reception circuit 123 having a large input dynamic range DR while satisfying limitations such as the high frequency performance, cost, and size. For example, when the reception circuit 123 capable of the inputting the 10 Gbps reception voltages $V_{rp}$ and $V_{rn}$ is designed, the operable frequency band of semiconductor elements used in the reception circuit 123 is at least around 10 to 20 GHz. Generally, such a high-frequency semiconductor can permit an input voltage range of 10 V or below. However, the noise voltage $V_n$ such as electrostatic noise may become several kilovolts to several tens of kilovolts. In this state, spatial noise based on the noise voltage $V_n$ becomes at least 10 V or higher. As clearly demonstrated by this example, to increase the input dynamic range DR of the reception circuit 123, it is necessary to provide a new unit for restricting spatial noise based on the noise voltage $V_n$ mixed in the reception voltages $V_{rp}$ and $V_{rn}$ in accordance with the design.

Figure 5:
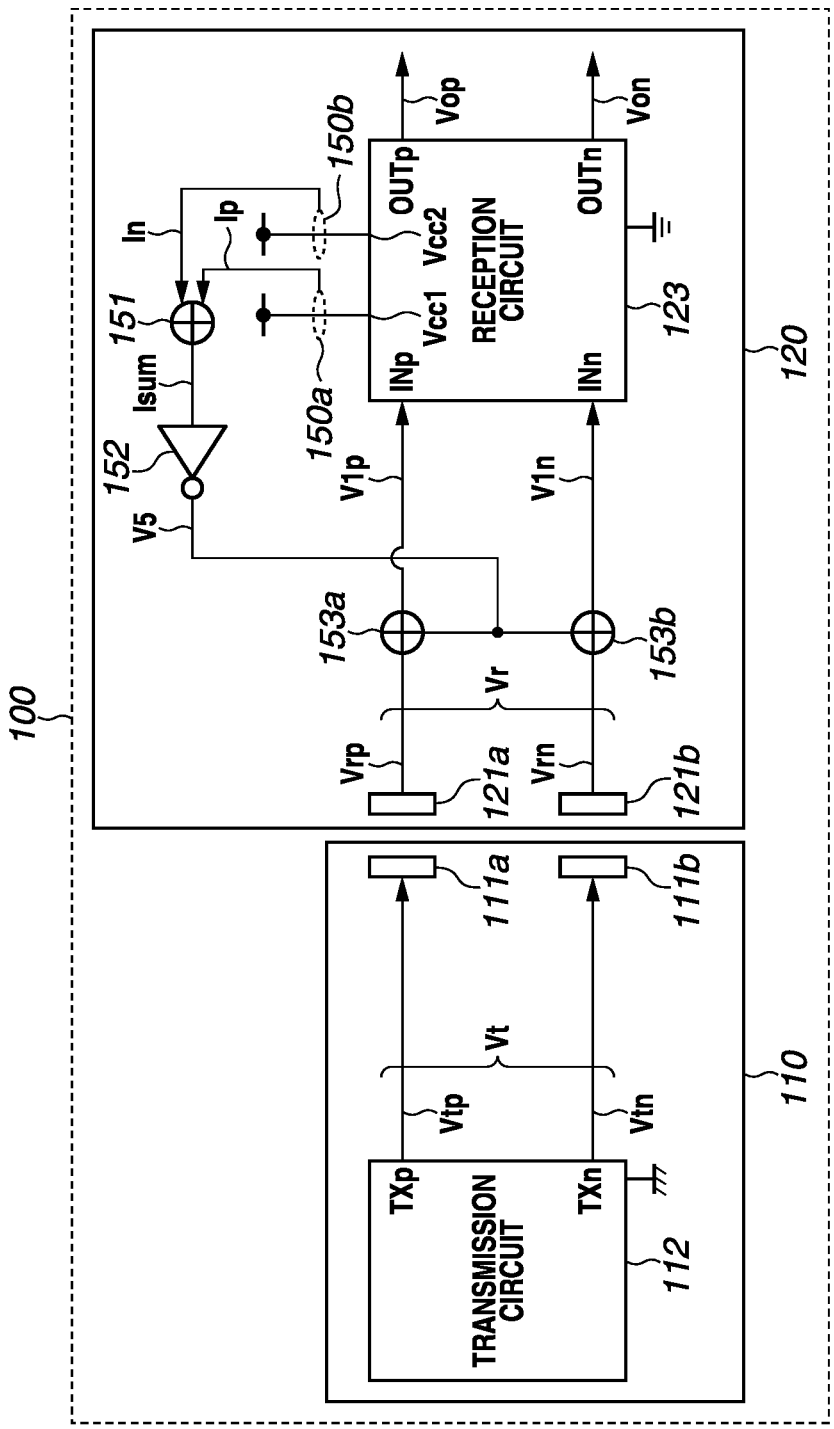
FIG. 5 is a block diagram illustrating an example configuration of the communication system.

FIG. 5 is a block diagram illustrating an example configuration of the communication system 100 according to the first exemplary embodiment.

The communication system 100 includes the transmission unit 110 and the reception unit 120. Like the transmission unit 110 in FIG. 1, the transmission unit 110 in FIG. 5 includes the electrodes 111a and 111b and the transmission circuit 112. The reception unit 120 in FIG. 5 includes current consumption detection units or circuits 150a and 150b, a total current consumption calculation unit or circuit 151, a feedback voltage generation unit or circuit 152, and addition units or circuits 153a and 153b as additional units or circuits to the reception unit 120 in FIG. 1. A method for controlling the communication system 100 will be described below.

The electrode 121a generates the reception voltage $V_{rp}$ corresponding to the transmission voltage $V_{tp}$. The electrode 121b generates the reception voltage $V_{rn}$ corresponding to the transmission voltage $V_{tn}$. The addition unit 153a adds a feedback voltage $V_5$ to the reception voltage $V_{rp}$ and outputs a reception voltage $V_{1p}$. The addition unit 153b adds the feedback voltage $V_5$ to the reception voltage $V_{rn}$ and outputs a reception voltage $V_{1n}$.

The input terminal INp of the reception circuit 123 inputs the reception voltage $V_{1p}$. The input terminal INn of the reception circuit 123 inputs the reception voltage $V_{1n}$. The output terminal OUTp of the reception circuit 123 outputs the output voltage $V_{op}$. The output terminal OUTn of the reception circuit 123 outputs the output voltage $V_{on}$. The reception circuit 123 amplifies the reception voltages $V_{1p}$ and $V_{1n}$ or subjects the voltages to the impedance transformation, and outputs the output voltages $V_{op}$ and $V_{on}$, respectively.

The current consumption detection unit 150a detects a current consumption $I_p$ through a power terminal Vcc1 of the reception circuit 123. The current consumption detection unit 150b detects a current consumption $I_n$ through a power terminal Vcc2 of the reception circuit 123. The total current consumption calculation unit 151 calculates a total current consumption $L_{sum}$ as the sum of the current consumptions $I_p$ and $I_n$. The feedback voltage generation unit 152 generates the feedback voltage $V_5$ as the product of the total current consumption $L_{sum}$ and a negative constant. The addition unit 153a adds the feedback voltage $V_5$ to the reception voltage $V_{rp}$ and outputs the reception voltage $V_{1p}$. The addition unit 153b adds the feedback voltage $V_5$ to the reception voltage $V_{rn}$ and outputs the reception voltage $V_{1n}$.

Figure 6:
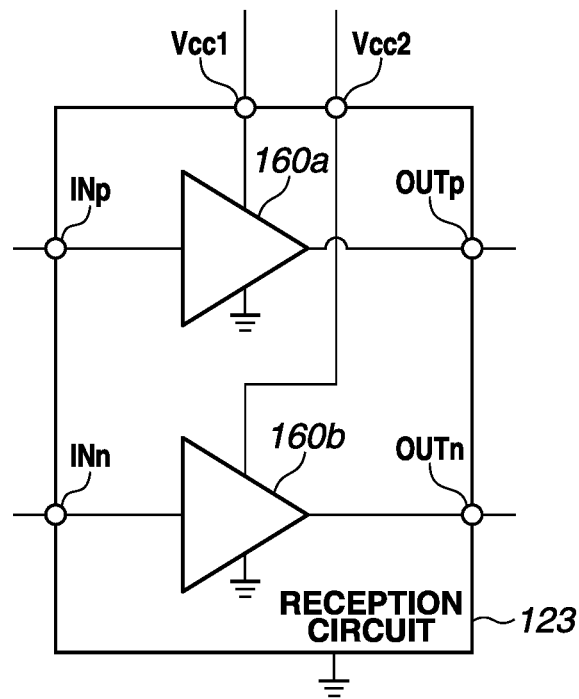
FIG. 6 illustrates an example configuration of a reception circuit.

FIG. 6 is a circuit diagram illustrating an example configuration of the reception circuit 123 in FIG. 5. The reception circuit 123 includes amplifiers 160a and 160b. The amplifiers 160a and 160b are two independent amplifiers operating based on the reference potential (ground potential).

The amplifier 160a is connected to the input terminal INp, the output terminal OUTp, and the power terminal Vcc1. The input terminal INp inputs the reception voltage $V_{1p}$ in FIG. 5. The output terminal OUTp outputs the output voltage $V_{op}$ in FIG. 5. The power terminal Vcc1 is connected to the power potential node in FIG. 5. The amplifier 160a amplifies the reception voltage $V_{1p}$ of the input terminal INp and outputs the output voltage $V_{op}$ to the output terminal OUTp.

The amplifier 160b is connected to the input terminal INn, the output terminal OUTn, and the power terminal Vcc2. The input terminal INn inputs the reception voltage $V_{1n}$ in FIG. 5. The output terminal OUTn outputs the output voltage $V_{on}$ in FIG. 5. The power terminal Vcc2 is connected to the power potential node in FIG. 5. The amplifier 160b amplifies the reception voltage $V_{1n}$ of the input terminal INn and outputs the output voltage $V_{on}$ to the output terminal OUTn.

When the amplitude of the reception voltage $V_{1p}$ increases, the current consumption $I_p$ through the power terminal Vcc1 also increases in proportion to the amplitude of the reception voltage $V_{1p}$. Likewise, when the amplitude of the reception voltage $V_{1n}$ increases, the current consumption $I_n$ through the power terminal Vcc2 also increases in proportion to the amplitude of the reception voltage $V_{1n}$. This is because, when the amplitudes of the reception voltages $V_{1p}$ and $V_{1n}$ increase, the power supplied to the resistive loads connected to the output terminals OUTp and OUTn, respectively increases. More specifically, there is a strong correlation between the amplitudes of the reception voltages $V_{1p}$ and $V_{1n}$ and the current consumptions $I_p$ and $I_n$ through the power terminals Vcc1 and Vcc2, respectively. According to the present exemplary embodiment, the reception unit 120 uses the strong correlation to restrict spatial noise based on the noise voltage $V_n$ mixed in the reception voltages $V_{rp}$ and $V_{rn}$.

Equation (1) represents the reception voltage $V_{rp}$ in FIG. 5, and Equation (2) represents the reception voltage $V_{rn}$ in FIG. 5. The reception voltages $V_{rp}$ and $V_{rn}$ contain spatial noise based on the noise voltage $V_n$. To simplify the description, it is assumed that the transmission voltages $V_{tp}$ and $V_{tn}$ and the noise voltage $V_n$ are sine waves. The first terms of Equations (1) and (2) are reception voltages (data signals) based on the transmission voltage $V_{tp}$ and $V_{tn}$, respectively, and are differential signals. Therefore, the first terms of Equations (1) and (2) have different signs. The second terms of Equations (1) and (2) denote spatial noise based on the noise voltage $V_n$. $\omega_d$ denotes the angular frequency of the reception voltage (data signal) based on the transmission voltages $V_{tp}$ and $V_{tn}$. $\omega_n$ denotes the angular frequency of spatial noise based on the noise voltage $V_n$. The angular frequencies $\omega_d$ and $\omega_n$ may be either identical or different. In either case, the reception unit 120 can restrict spatial noise based on the noise voltage $V_n$ mixed in the reception voltages $V_{rp}$ and $V_{rn}$.

$$V_{rp} = \sin(\omega_d t)\sin(\omega_n t) \quad (1)$$

$$V_{rn} = -\sin(\omega_d t)\sin(\omega_n t) \quad (2)$$

Equation (3) represents the reception voltage $V_{1p}$ in FIG. 5, and Equation (4) represents the reception voltage $V_{1n}$ in FIG. 5. The addition unit 153a adds the feedback voltage $V_5$ to the reception voltage $V_{rp}$ and outputs the reception voltage $V_{1p}$. The addition unit 153b adds the feedback voltage $V_5$ to the reception voltage $V_{rn}$ and outputs the reception voltage $V_{1n}$. In the initial state, the feedback voltage $V_5$ is assumed to be zero. In this state, the reception voltage $V_{1p}$ is the same as the reception voltage $V_{rp}$, and the reception voltage $V_{1n}$ is the same as the reception voltage $V_{rn}$.

$$V_{1p} = V_{rp} + V_5 = V_{rp} + 0 = V_{rp} \quad (3)$$

$$V_{1n} = V_{rn} + V_5 = V_{rn} + 0 = V_{rn} \quad (4)$$

Relation (5) represents the current consumption $I_p$ in FIG. 5, and Relation (6) represents the current consumption $I_n$ in FIG. 5. The current consumption detection unit 150a detects the current consumption $I_p$ through the power terminal Vcc1 of the reception circuit 123. The current consumption detection unit 150b detects the current consumption $I_n$ through the power terminal Vcc2 of the reception circuit 123. As described above, there is a strong correlation between the amplitudes of the reception voltages $V_{1p}$ and $V_{1n}$ and the current consumptions $I_p$ and $I_n$, respectively. The current consumption $I_p$ is proportional to the reception voltage $V_{1p}$, and the current consumption $I_n$ is proportional to the reception voltage $V_{1n}$. The current consumption $I_p$ is represented by Equation (7) and the current consumption $I_n$ is represented by Equation (8) where α denotes a constant of proportion.

$$I_p \propto V_{1P} \tag{5}$$

$$I_n \propto V_{1n} \tag{6}$$

$$I_p = \alpha V_{1p} = \alpha(\sin(\omega_d t) + \sin(\omega_n t)) \tag{7}$$

$$I_n = \alpha V_{1n} = \alpha(-\sin(\omega_d t) + \sin(\omega_n t)) \tag{8}$$

Equation (9) represents the total current consumption $I_{sum}$ in FIG. 5. The total current consumption calculation unit 151 calculates the total current consumption $I_{sum}$ as the sum of the current consumptions $I_p$ and $I_n$.

$$I_{sum} = I_p + I_n = 2\alpha \sin(\omega_n t) \tag{9}$$

Equation (10) represents the feedback voltage $V_5$ in FIG. 5, and Equation (11) represents a voltage gain Ga. The feedback voltage generation unit 152 generates the feedback voltage $V_5$ as the product of the total current consumption $I_{sum}$ and the voltage gain Ga. The voltage gain Ga is a negative constant. Substituting Equation (11) for Equation (10) gives Equation (12).

$$V_5 = Ga \times I_{sum} = Ga \times 2\alpha \sin(\omega_n t) \tag{10}$$

$$Ga = -\frac{1}{2\alpha} \tag{11}$$

$$V_5 = -\sin(\omega_n t) \tag{12}$$

Equation (13) represents the reception voltage $V_{1p}$ in FIG. 5, and Equation (14) represents the reception voltage $V_{1n}$ in FIG. 5. The addition unit 153a adds the feedback voltage $V_5$ to the reception voltage $V_{rp}$ and outputs the reception voltage $V_{1p}$. The addition unit 153b adds the feedback voltage $V_5$ to the reception voltage $V_{rn}$ and outputs the reception voltage $V_{1n}$. When Equation (12) is substituted for the feedback voltage $V_5$ in Equation (13), spatial noise $\sin(\omega_n t)$ based on the noise voltage $V_n$ is removed from the reception voltage $V_{1p}$, and only the reception voltage (data signal) $\sin(\omega_d t)$ based on the transmission voltage $V_{tp}$ remains. When Equation (12) is substituted for the feedback voltage $V_5$ in Equation (14), spatial noise $\sin(\omega_n t)$ based on the noise voltage $V_n$ is removed from the reception voltage $V_{1n}$, and only the reception voltage (data signal) $-\sin(\omega_d t)$ based on the transmission voltage $V_{tn}$ remains.

$$V_{1p} = V_{rp} + V_5 = V_{rp} - \sin(\omega_n t) = \sin(\omega_d t) \tag{13}$$

$$V_{1n} = V_{rn} + V_5 = V_{rn} - \sin(\omega_n t) = -\sin(\omega_d t) \tag{14}$$

The reception circuit 123 amplifies the reception voltages $V_{1p}$ and $V_{1n}$ with spatial noise eliminated.

Since spatial noise has been eliminated from the reception voltages $V_{1p}$ and $V_{1n}$, the reception unit 120 enables preventing the reception voltages $V_{1p}$ and $V_{1n}$ from exceeding the input dynamic range DR of the reception circuit 123. This enables the reception unit 120 to restrict the distortion of the output signal $V_o$ to improve the signal quality of the output signal $V_o$, thus decreasing the probability that a data error occurs.

As described above, even if the reception voltages $V_{rp}$ and $V_{rn}$ contain spatial noise, the reception voltages $V_{1p}$ and $V_{1n}$ with spatial noise eliminated can be input to the reception circuit 123 of the reception unit 120.

It is desirable that the voltage gain Ga in Equation (11) be suitably designed in consideration of the relation between the input impedances of the amplifiers 160a and 160b and the output impedance of the feedback voltage generation unit 152.

The above-described principle for restricting spatial noise can be considered as what is called the negative feedback of spatial noise. Further, there may be many cases where restricting spatial noise to a higher degree is more preferable. Therefore, it is desirable that the feedback voltage generation unit 152 has a sufficiently large voltage gain Ga at the angular frequency $\omega_n$ of assumed spatial noise. However, strict design is not required.

The total current consumption $I_{sum}$ may be a value proportional to the sum of the current consumptions $I_p$ and $I_n$. If the feedback voltage $V_5$ is equivalent to Equation (12), the addition units 153a and 153b can output the reception voltages $V_{1p}$ and $V_{1n}$, respectively, with restricted spatial noise. Even if the total current consumption $I_{sum}$ is a value proportional to the sum of the current consumptions $I_p$ and $I_n$ with a negative constant of proportion, and the voltage gain Ga in Equation (11) is a positive constant, spatial noise can be restricted.

Figure 7:
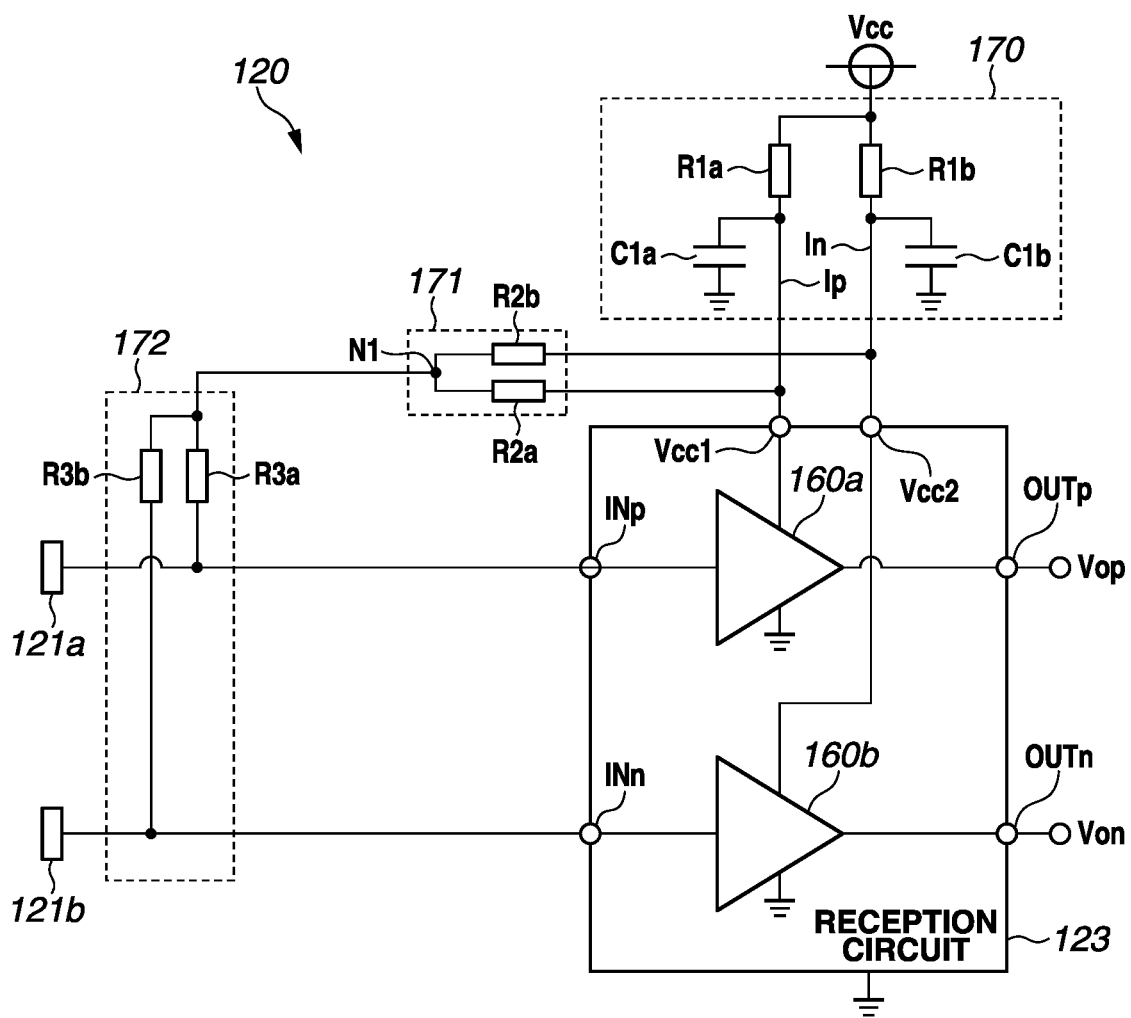
FIG. 7 is a circuit diagram illustrating an example configuration of the reception unit.

FIG. 7 is a circuit diagram illustrating an example configuration of the reception unit 120 according to the first exemplary embodiment. The reception unit 120 includes the electrodes 121a and 121b, the reception circuit 123, a current consumption detection unit 170, a total current consumption calculation unit 171, and an addition unit 172. The current consumption detection unit 170 corresponds to the current consumption detection units 150a and 150b in FIG. 5. The total current consumption calculation unit 171 corresponds to the total current consumption calculation unit 151 and the feedback voltage generation unit 152 in FIG. 5. The addition unit 172 corresponds to the addition units 153a and 153b in FIG. 5. The reception circuit 123 has the same configuration as the reception circuit 123 in FIG. 6.

The current consumption detection unit 170 includes resistors R1a and R1b and capacitors C1a and C1b. The resistor R1a is connected between a power potential node Vcc and the power terminal Vcc1. The resistor R1b is connected between the power potential node Vcc and the power terminal Vcc2. The capacitor C1a is connected between the power terminal Vcc1 and a reference potential node. The capacitor C1b is connected between the power terminal Vcc2 and the reference potential node.

The resistors R1a and R1b are current consumption detection resistors for generating voltage drops proportional to the current consumptions $I_p$ and $I_n$ consumed by the amplifiers 160a and 160b, respectively. The voltage drops across the resistors R1a and R1b increase with increasing current consumptions $I_p$ and $I_n$, respectively. Thus, the voltages of the power terminals Vcc1 and Vcc2 are proportional to the current consumptions $I_p$ and $I_n$, respectively, with a negative constant of proportion. As described above, the current consumption detection unit 170 generates voltages proportional to the current consumptions $I_p$ and $I_n$ with a negative constant of proportion, as the voltages of the power terminals Vcc1 and Vcc2, respectively.

The capacitors C1a and C1b are decoupling capacitors. The capacitors C1a and C1b reduces the impedances of the power terminals Vcc1 and Vcc2 in the high-frequency band (the band higher than the angular frequency ω on of the noise voltage $V_n$) to stabilize the operations of the amplifiers 160a and 160b, respectively. It is desirable that the cut-off frequency of the low-pass filter including the resistors R1a and R1b and the capacitors C1a and C1b is set to a frequency higher than the angular frequency ω on of the noise voltage $V_n$.

The total current consumption calculation unit 171 includes resistors R2a and R2b. The resistor R2a is connected between the power terminal Vcc1 and a node N1. The resistor R2b is connected between the power terminal Vcc2 and the node N1. The voltage of the node N1 corresponds to the sum of the voltages of the power terminals Vcc1 and Vcc2. More specifically, the total current consumption calculation unit 171 generates, as the voltage of the node N1, a voltage corresponding to the sum of the voltage proportional to the current consumption $I_p$ with a negative constant of proportion, and the voltage proportional to the current consumption $I_n$ with a negative constant of proportion. The voltage of the node N1 corresponds to the feedback voltage $V_5$ in FIG. 5.

The total current consumption calculation unit 171 may include an amplifier having a high input impedance, such as an operational amplifier. Very similar characteristics of the amplifiers 160a and 160b may cause close bias currents (current consumption when no signal is input) of the amplifiers 160a and 160b. In this case, the resistors R2a and R2b of the total current consumption calculation unit 171 may be short-circuited.

The addition unit 172 includes resistors R3a and R3b. The electrode 121a is connected to the input terminal INp. The electrode 121b is connected to the input terminal INn. The resistor R3a is connected between the node N1 and the input terminal INp. The resistor R3b is connected between the node N1 and the input terminal INn. The addition unit 172 adds the voltage of the node N1 to the reception voltage of the electrode 121a and adds the voltage of the node N1 to the reception voltage of the electrode 121b. The voltage of the input terminal INp corresponds to the reception voltage $V_{1p}$ in FIG. 5, with spatial noise restricted. The voltage of the input terminal INn corresponds to the reception voltage $V_{1n}$ in FIG. 5, with spatial noise restricted.

As described above, the reception unit 120 has an effect of restricting spatial noise components in the voltage of the input terminal INp and spatial noise components in the voltage of the input terminal INn. Neither the relation to the direct-current potential (bias potential) at different points in the circuit nor the function of adjusting the direct-current potential is included herein. It is necessary to suitably add a function of adjusting the direct-current potential (bias potential) so that the direct-current potential (bias potential) is set in a range where semiconductor elements can normally operate. In this case, it is desirable to insert a coupling capacitor having a sufficiently low impedance at the lowest angular frequency of the noise voltage $V_n$, in the feedback path of the feedback voltage $V_5$.

Figure 8:
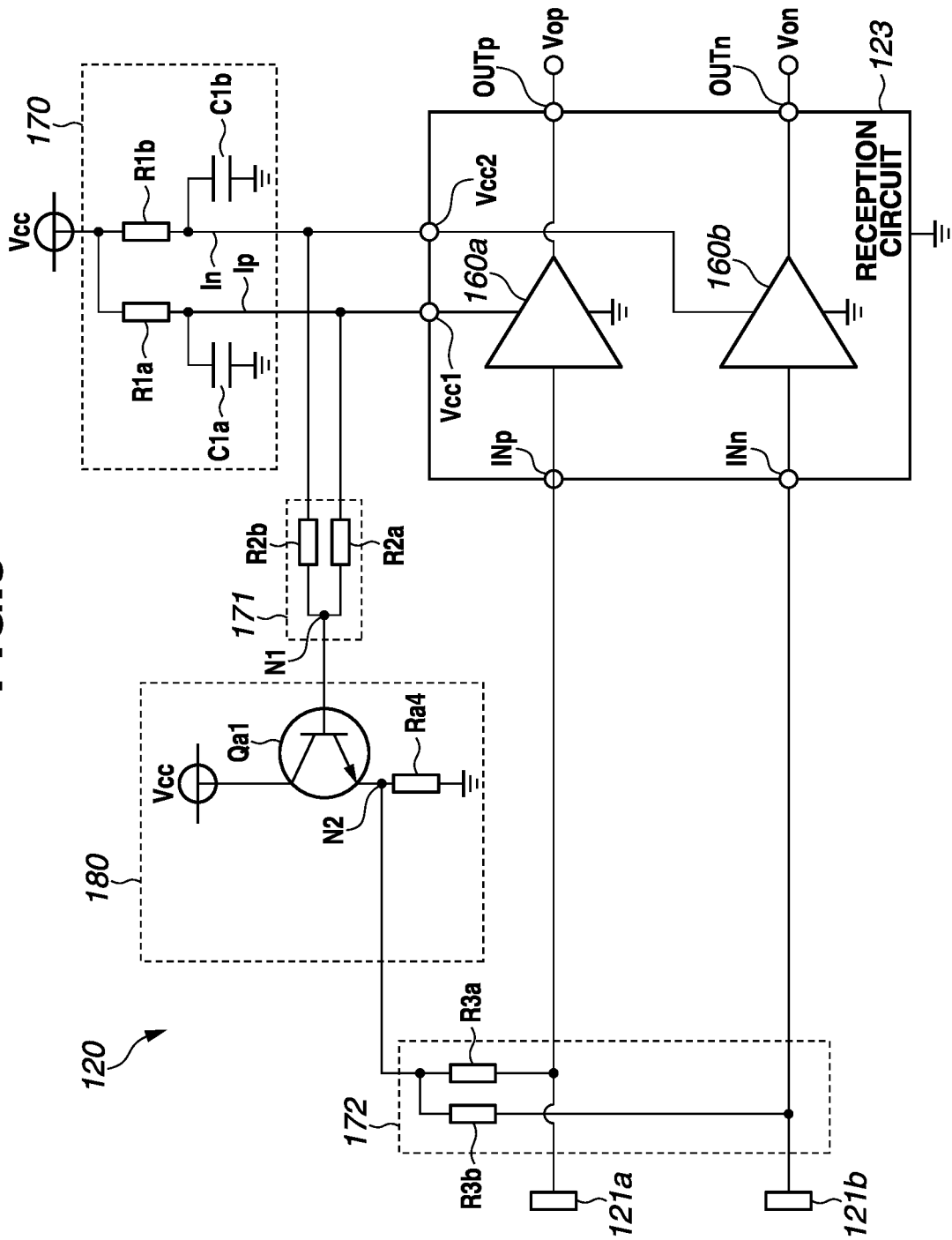
FIG. 8 is another circuit diagram illustrating an example configuration of the reception unit.

FIG. 8 is a circuit diagram illustrating another example configuration of the reception unit 120 according to the first exemplary embodiment. The reception unit 120 in FIG. 8 includes a feedback voltage generation unit 180 as an additional unit to the reception unit 120 in FIG. 7. Differences of the reception unit 120 in FIG. 8 from that in FIG. 7 will be described below.

The feedback voltage generation unit 180 includes an npn bipolar transistor Qa1 and a resistor Ra4, and is formed of a common collector amplifier circuit. $I_n$ the npn bipolar transistor Qa1, the collector is connected to the power potential node Vcc, the base is connected to the node N1, and the emitter is connected to the node N2. The resistor Ra4 is connected between the node N2 and the reference potential node. The resistor R3a is connected between the node N2 and the input terminal INp. The resistor R3b is connected between the node N2 and the input terminal INn. The voltage of the node N2 corresponds to the feedback voltage $V_5$ in FIG. 5.

Providing the feedback voltage generation unit 180 obtains an effect of enhancing the isolation between the total current consumption calculation unit 171 and the addition unit 172. Further, the feedback voltage generation unit 180 reduces the impedance of the node N2 and enables supplying a voltage sufficient to restrict spatial noise to the node N2 even with low input impedances of the amplifiers 160a and 160b.

Figure 9:
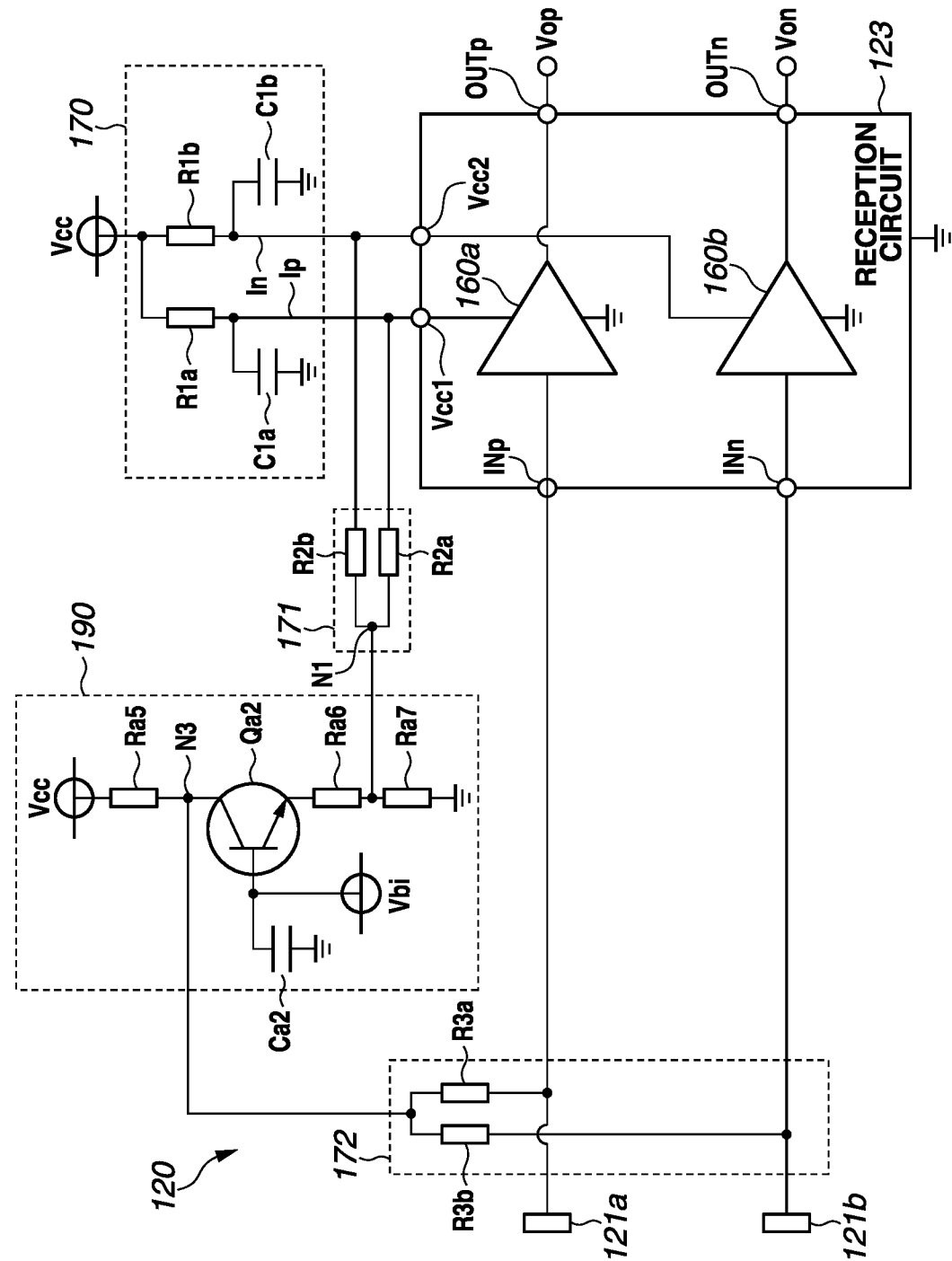
FIG. 9 is yet another circuit diagram illustrating an example configuration of the reception unit.

FIG. 9 is a circuit diagram illustrating still another example configuration of the reception unit 120 according to the first exemplary embodiment. The reception unit 120 in FIG. 9 includes a feedback voltage generation unit 190 as an additional unit to the reception unit 120 in FIG. 7. Differences of the reception unit 120 in FIG. 9 from that in FIG. 7 will be described below.

The feedback voltage generation unit 190 includes an npn bipolar transistor Qa2, resistors Ra5, Ra6, and Ra7, and a capacitor Ca2, and is formed of a common base amplifier circuit. The resistor Ra5 is connected between the power potential node Vcc and a node N3. For the npn bipolar transistor Qa2, the collector is connected to the node N3, and the base is connected to a bias potential node Vbi. The capacitor Ca2 is connected between the base of the npn bipolar transistor Qa2 and the reference potential node. The resistor Ra6 is connected between the emitter of the npn bipolar transistor Qa2 and the node N1. The resistor Ra7 is connected between the node N1 and the reference potential node. The resistor R3a is connected between the node N3 and the input terminal INp. The resistor R3b is connected between the node N3 and the input terminal INn. The voltage of the node N3 corresponds to the feedback voltage $V_5$ in FIG. 5.

Providing the feedback voltage generation unit 190 obtains an effect of enhancing the isolation between the total current consumption calculation unit 171 and the addition unit 172. Further, the feedback voltage generation unit 190 reduces the impedance of the node N3 and enables supplying a voltage sufficient to restrict spatial noise to the node N3 even with low input impedances of the amplifiers 160a and 160b.

The feedback voltage generation unit 190 formed of a common base amplifier circuit enables increasing the voltage gain of the feedback voltage generation unit 190 for the reception unit 120 in FIGS. 7 and 8. As described above, it is desirable that the feedback voltage generation unit 190 has a sufficiently large voltage gain at the angular frequency $\omega_n$ of the assumed noise voltage $V_n$. However, strict design is not required. Therefore, the feedback voltage generation unit 190 formed of a common base amplifier circuit enables enhancing an effect of restricting spatial noise.

Figure 10A:
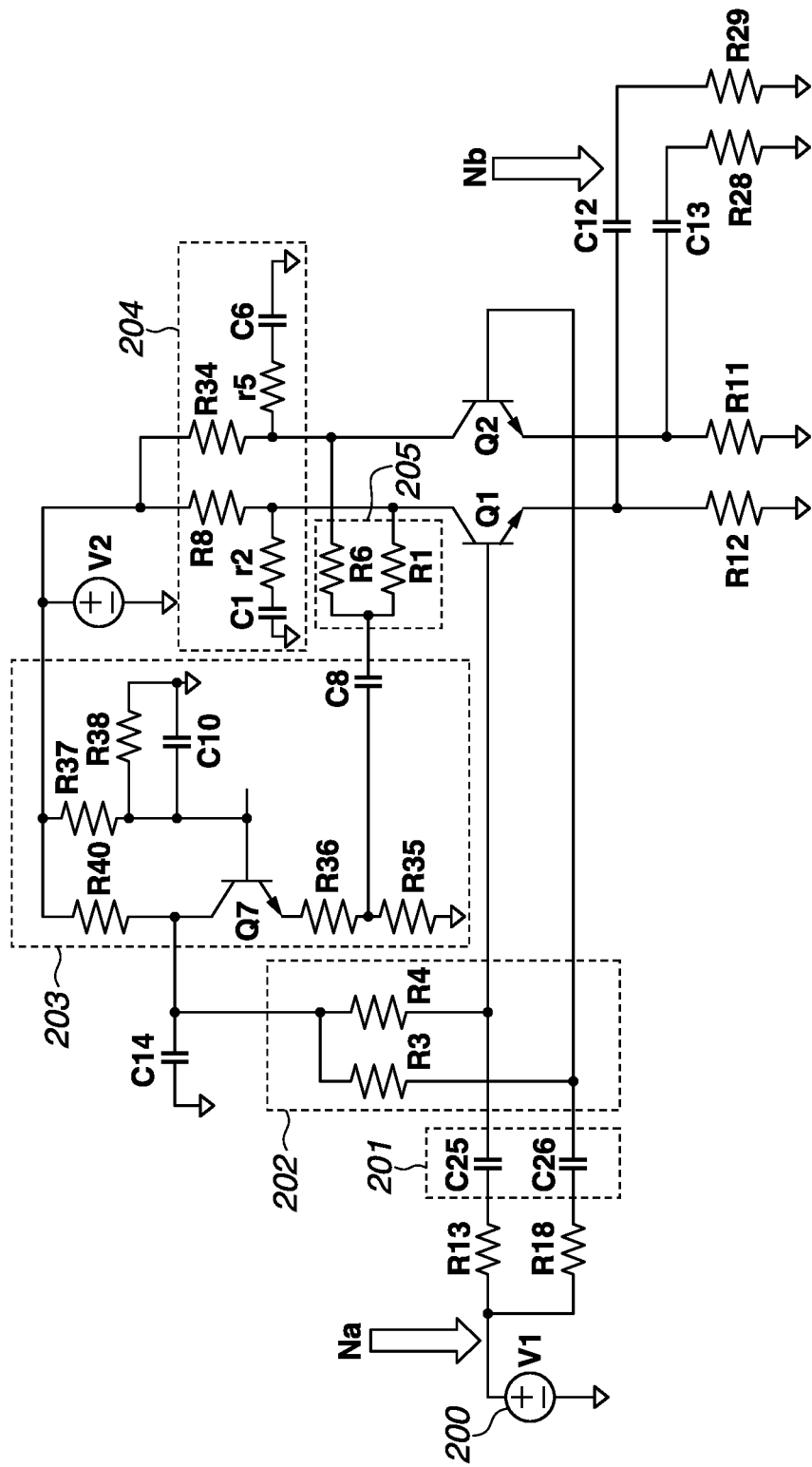
FIGS. 10A to 10C illustrate results of simulation in the reception unit.

FIG. 10A illustrates a circuit model of the reception unit 120 in FIG. 9 generated by using a circuit simulator. A current consumption detection unit 204 corresponds to the current consumption detection unit 170 in FIG. 9 and detects the current consumptions by amplifiers (common collector amplifier circuits) Q1 and Q2. The amplifiers Q1 and Q2 correspond to the amplifiers 160a and 160b in FIG. 9, respectively. Resistors R8 and R34 are current consumption detection resistors for generating voltage drops proportional to the current consumptions by the amplifiers Q1 and Q2, respectively. The voltage drops across the resistors R8 and R34 increase with increasing current consumptions of the amplifier Q1 and Q2, respectively. More specifically, the resistors R8 and R34 can generate voltages proportional to the current consumptions by the amplifiers Q1 and Q2 with a negative constant of proportion. Capacitors C1 and C6 are decoupling capacitors. The capacitors C1 and C6 stabilize the operations of the amplifiers Q1 and Q2, respectively, in the high-frequency band.

A total current consumption calculation unit 205 corresponds to the total current consumption calculation unit 171 in FIG. 9, and calculates, via resistors R1 and R6, the sum of the voltages proportional to the current consumptions by the amplifiers Q1 and Q2 generated by the resistors R8 and R34, respectively, with a negative constant of proportion. In this case, the amplifiers Q1 and Q2 use the same transistor and have very similar performances. Therefore, since the bias currents of the amplifiers Q1 and Q2 are close to each other, the resistors R1 and R6 of the total current consumption calculation unit 205 may be short-circuited.

The feedback voltage generation unit 203 corresponds to the feedback voltage generation unit 190 and amplifies the output voltage of the total current consumption calculation unit 205 to generate a feedback voltage.

An addition unit 202 corresponds to the addition unit 172 in FIG. 9 and adds the feedback voltages generated via the resistors R3 and R4 to the reception voltages output from capacitors C25 and C26 of a coupler 201, respectively. The coupler 201 corresponds to the electrodes 121a and 121b in FIG. 9.

A voltage source 200 simulates the electromagnetic noise source 130 in FIG. 3. Noise voltages generated by the voltage source 200 are input to the capacitors C25 and C26 of the coupler 201, in phase and with the same amplitude. This means a state where common-mode noise is input to the capacitors C25 and C26.

Figure 10B:
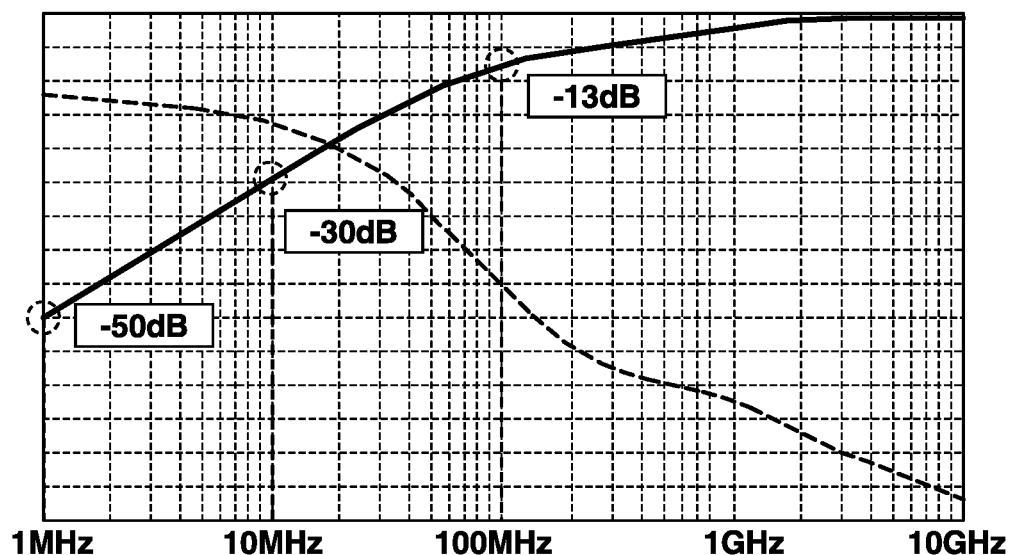
Figure 10C:
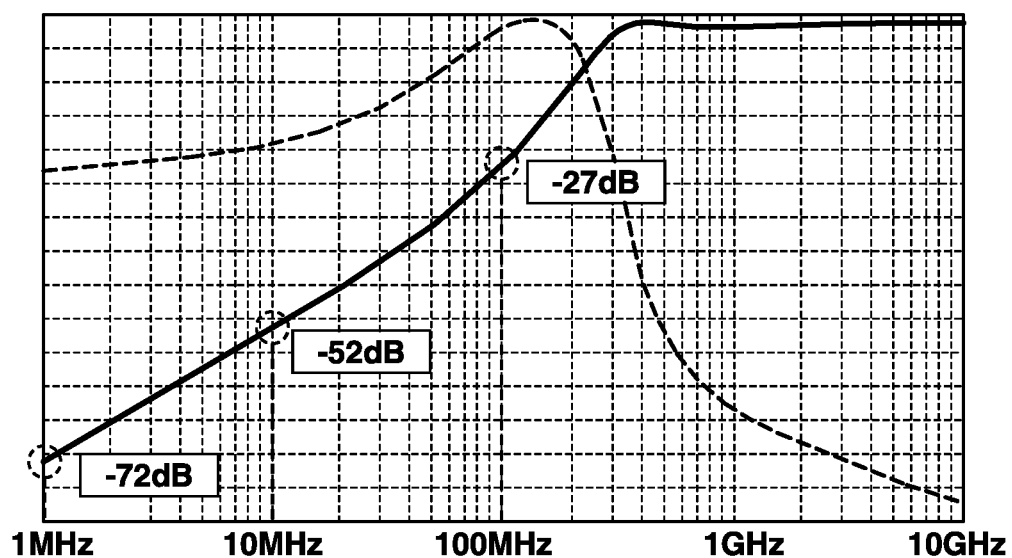

FIG. 10B illustrates the transfer characteristics of the range from an input node Na to an output node Nb in a case where the total current consumption calculation unit 205 and the feedback voltage generation unit 203 in FIG. 10A are disconnected. FIG. 10C illustrates the transfer characteristics of the range from the input node Na to the output node Nb in a case where the total current consumption calculation unit 205 and the feedback voltage generation unit 203 in FIG. 10A are connected.

The transfer characteristics in FIGS. 10B and 10C are compared at different frequencies, 1 MHz, 10 MHz, and 100 MHz. At 1 MHz, the transfer characteristic in FIG. 10B is −50 dB, and the transfer characteristic in FIG. 10C is −72 dB. Based on the effect of the present exemplary embodiment, the transfer characteristic in FIG. 10C (−72 dB) can reduce the noise voltage by 22 dB in comparison with the transfer characteristic in FIG. 10B (−50 dB).

At 10 MHz, the transfer characteristic in FIG. 10B is −30 dB, and the transfer characteristic in FIG. 10C is −52 dB. Based on the effect of the present exemplary embodiment, the transfer characteristic in FIG. 10C (−52 dB) can reduce the noise voltage by 22 dB in comparison with the transfer characteristic in FIG. 10B (−30 dB).

At 100 MHz, the transfer characteristic in FIG. 10B is −13 dB, and the transfer characteristic in FIG. 10C is −27 dB. Based on the effect of the present exemplary embodiment, the transfer characteristics in FIG. 10C (−27 dB) can reduce the noise voltage by 14 dB in comparison with the transfer characteristic in FIG. 10B (−13 dB).

The above-described results indicate that providing the addition unit 202, the feedback voltage generation unit 203, the current consumption detection unit 204, and the total current consumption calculation unit 205 in the reception unit 120 achieves an effect of reducing the noise voltage to about one-tenth by using a relatively simple circuit configuration. The effect according to the present exemplary embodiment is not limited to the communication system 100. When the condition of a fourth exemplary embodiment (described below) is satisfied, the effect according to the present exemplary embodiment is highly likely to be achieved even if the transmission unit 110 and the reception unit 120 are directly wiredly connected.

As described above, the communication system 100 includes the transmission unit 110 and the reception unit 120. The transmission unit 110 is a transmission apparatus, and the reception unit 120 is a reception apparatus. The transmission unit 110 includes electrodes 111a and 111b. The reception unit 120 includes electrodes 121a and 121b. The electrodes 111a and 121a are mutually coupled by electric field or magnetic field. The electrodes 111b and 121b are mutually coupled by electric field or magnetic field. The transmission unit 110 transmits signals to the reception unit 120.

The reception circuit 123 inputs reception signals of the input terminals INp and INn. The feedback voltage generation unit 152 as a control unit controls the reception signals input to the reception circuit 123 according to the current consumption of the reception circuit 123. More specifically, the feedback voltage generation unit 152 controls the reception signals input to the reception circuit 123 so that the reception signals fit into the input dynamic range DR of the reception circuit 123. The feedback voltage generation unit 152 restricts noise components in the reception signals input to the reception circuit 123 according to the current consumption of the reception circuit 123. Noise components are spatial noise based on the noise voltage $V_n$.

The feedback voltage generation unit 152 generates a feedback signal according to the current consumption of the reception circuit 123. For example, the feedback signal is the feedback voltage $V_5$. The reception circuit 123 inputs signals as the sums of the reception signals and the feedback signal. The feedback signal is, for example, the feedback voltage $V_5$ in Equation (10), and is a signal as the product of the current consumption of the reception circuit 123 and a negative coefficient. The negative coefficient is, for example, the voltage gain Ga.

The electrodes 121a and 121b receive the reception signals through electric field or magnetic field coupling. The electrode 121a is connected to the input terminal INp of the reception circuit 123. The electrode 121b is connected to the input terminal INn of the reception circuit 123. The reception circuit 123 amplifies the input reception signals or subjects the signals to the impedance transformation.

The reception circuit 123 includes the amplifiers 160a and 160b. The amplifier 160a amplifies the reception signal of the input terminal INp. The amplifier 160b amplifies the reception signal of the input terminal INn. The feedback voltage generation unit 152 controls the reception signals of the input terminals INp and INn according to the sum of the current consumption $I_p$ of the amplifier 160a and the current consumption $I_n$ of the amplifier 160b. The reception signals of the input terminals INp and INn are differential signals.

The electrode 121a is connected to the input terminal of the amplifier 160a. The electrode 121b is connected to the input terminal of the amplifier 160b.

The feedback voltage generation unit 180 in FIG. 8 includes the npn bipolar transistor Qa1 and the resistor Ra4, and is formed of a common collector amplifier circuit. The common collector amplifier circuit amplifies the feedback signal.

The feedback voltage generation unit 190 in FIG. 9 includes the npn bipolar transistor Qa2, the resistors Ra5, Ra6, and Ra7, and the capacitor Ca2, and is formed of a common base amplifier circuit. The common base amplifier circuit amplifies the feedback signal.

According to the present exemplary embodiment, the reception unit 120 can restrict the maximum amplitude of the reception signals within the input dynamic range DR of the amplifiers 160a and 160b even if the electromagnetic field intensity of spatial noise is higher than the amplitudes of the reception signals. This enables the reception unit 120 to improve the quality of the reception signals.

Figure 11:
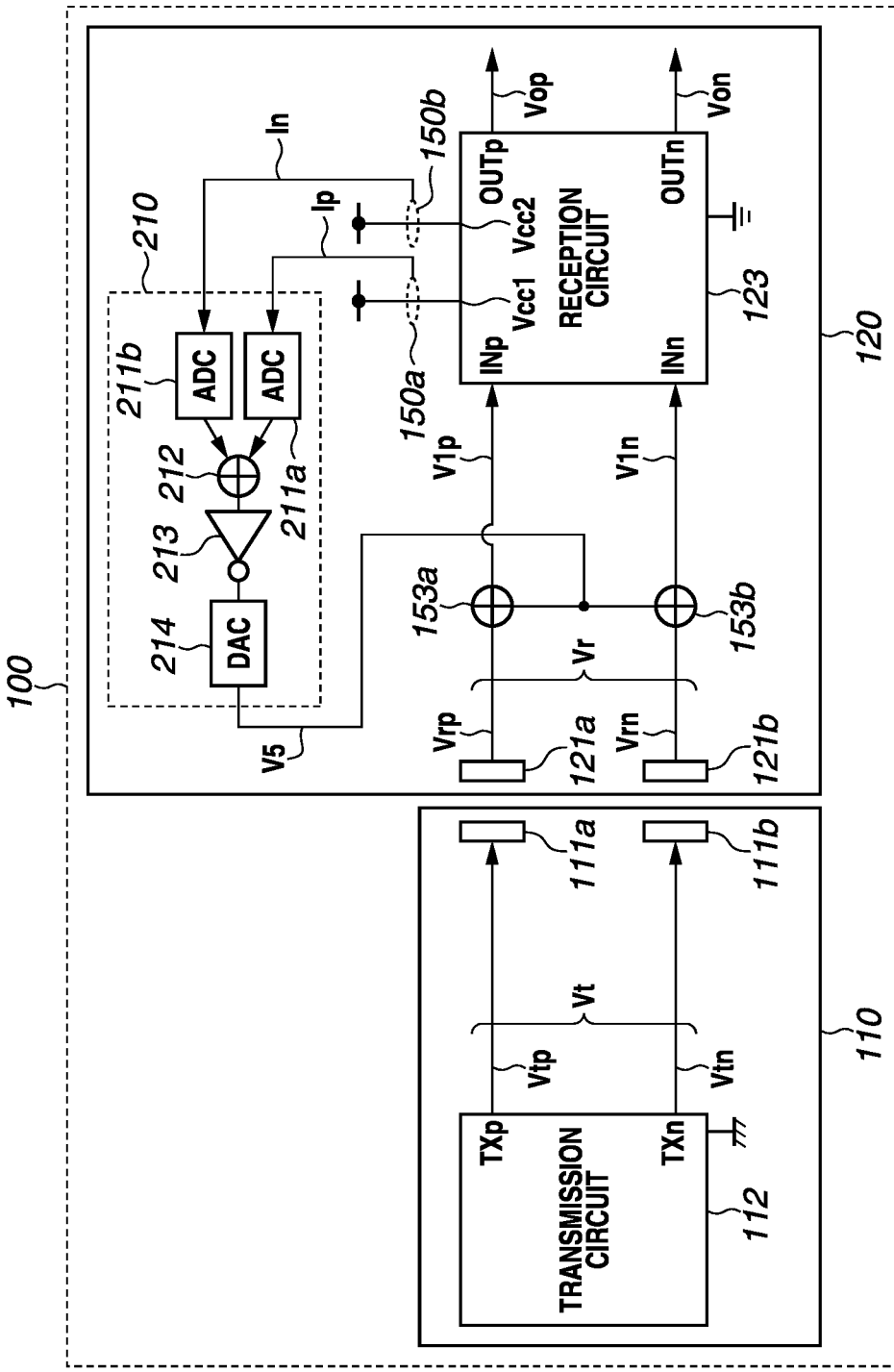
FIG. 11 is another block diagram illustrating an example configuration of the communication system.

FIG. 11 is a block diagram illustrating an example configuration of the communication system 100 according to a second exemplary embodiment. Referring to FIG. 11, the total current consumption calculation unit 151 and the feedback voltage generation unit 152 in FIG. 5 are replaced with a control unit 210. The control unit 210 includes analog-to-digital converters (ADC) 211a and 211b, a total current consumption calculation unit 212, a feedback voltage generation unit 213, and a digital-to-analog converter (DAC) 214. The control unit 210 can be configured by using a micro controller unit and a Field Programmable Gate Array (FPGA).

The ADC 211a converts the voltage value proportional to the current consumption $I_p$ detected by the current consumption detection unit 150a with a positive constant of proportion (or a negative constant of proportion) into a digital value. The ADC 211b converts the voltage value proportional to the current consumption $I_n$ detected by the current consumption detection unit 150b with a positive constant of proportion (or a negative constant of proportion) into a digital value.

The total current consumption calculation unit 212 calculates the sum of the digital values converted by the ADCs 211a and 211b. The feedback voltage generation unit 213 multiplies the sum of the digital values calculated by the total current consumption calculation unit 212 by a predetermined coefficient to calculate the feedback voltage. The DAC 214 converts the digital value equivalent to the feedback voltage calculated by the feedback voltage generation unit 213 into the analog feedback voltage $V_5$.

The addition unit 153a adds the feedback voltage $V_5$ converted by the DAC 214 to the reception voltage $V_{rp}$ and outputs the reception voltage $V_{1p}$ to the input terminal INp. The addition unit 153b adds the feedback voltage $V_5$ converted by the DAC 214 to the reception voltage $V_{rn}$ and outputs the reception voltage $V_{1n}$ to the input terminal INn.

As described above, the control unit 210 generates a feedback signal (feedback voltage $V_5$) through digital signal processing. The present exemplary embodiment obtains a noise voltage reduction effect equivalent to that according to the first exemplary embodiment. The control unit 210 performs calculations related to the negative feedback through software processing. This configuration has an advantage that parameters for improving the noise voltage reduction effect can be set only through software modifications even if a noise situation changes.

Figure 12:
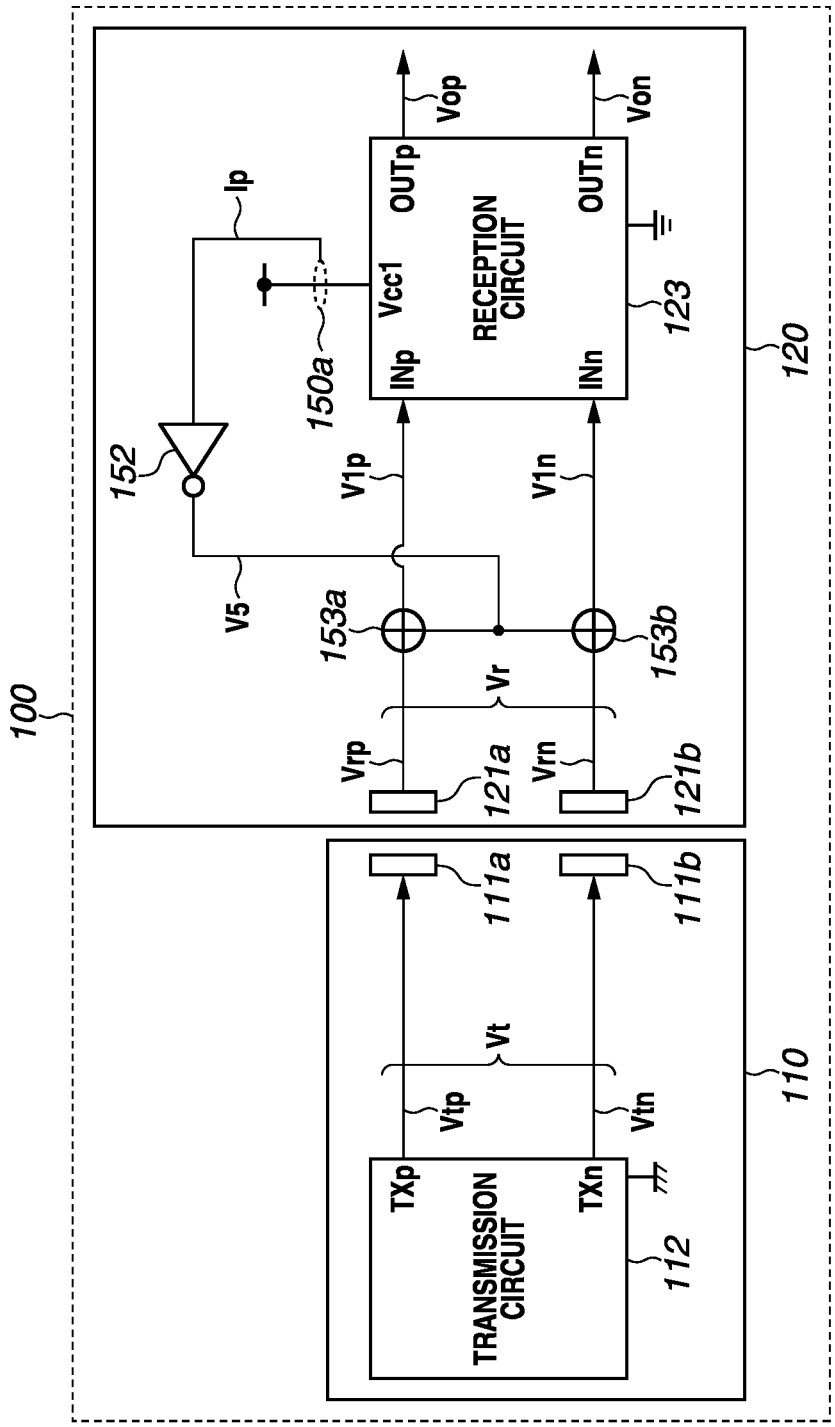
FIG. 12 is yet another block diagram illustrating an example configuration of the communication system.

FIG. 12 is a block diagram illustrating an example configuration of the communication system 100 according to a third exemplary embodiment. Referring to FIG. 12, the total current consumption calculation unit 151 and the current consumption detection unit 150b in FIG. 5 are removed.

Figure 13:
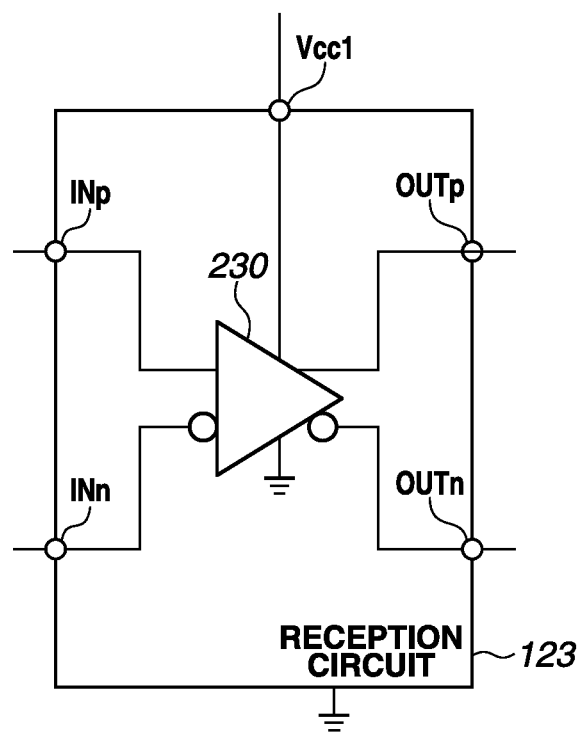
FIG. 13 illustrates another example configuration of the reception circuit.

FIG. 13 is a circuit diagram illustrating an example configuration of the reception circuit 123 in FIG. 12. The reception circuit 123 includes a differential amplifier 230. The differential amplifier 230 is connected to the input terminals INp and INn, the output terminal OUTp and OUTn, and the power terminal Vcc1. The input terminal INp inputs the reception voltage $V_{1p}$ in FIG. 12. The input terminal INn inputs the reception voltage $V_{1n}$ in FIG. 12. The output terminal OUTp outputs the output voltage Vol, in FIG. 12. The output terminal OUTn outputs the output voltage $V_{on}$ in FIG. 12. The power terminal Vcc1 is connected to the power potential node in FIG. 12.

The differential amplifier 230 amplifies the difference between the reception voltage $V_{1p}$ of the input terminal INp and the reception voltage $V_{1n}$ of the input terminal INn, and outputs the output voltage Vol, of the output terminal OUTp and the output voltage $V_{on}$ of the output terminal OUTn.

Figure 14:
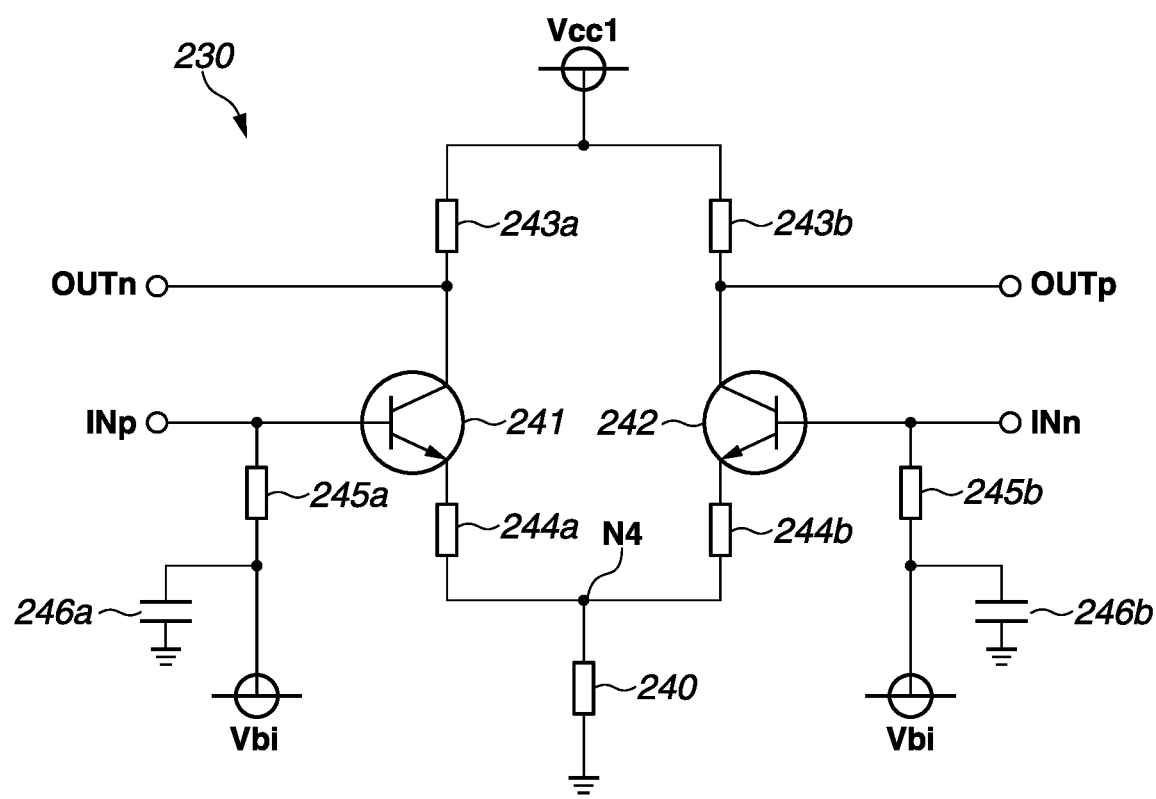
FIG. 14 illustrates an example configuration of a differential amplifier.

FIG. 14 is a circuit diagram illustrating an example configuration of the differential amplifier 230 in FIG. 13. The differential amplifier 230 includes npn bipolar transistors 241 and 242, a current source resistor 240, resistors 243a, 243b, 244a, 244b, 245a, and 245b, and capacitors 246a and 246b.

The resistor 243a is connected between the power terminal Vcc1 and the output terminal OUTn. In the npn bipolar transistor 241, the collector is connected to the output terminal OUTn, and the base is connected to the input terminal INp. The resistor 245a is connected between the input terminal INp and the bias potential node Vbi. The capacitor 246a is connected between the bias potential node Vbi and the reference potential node. The resistor 244a is connected between the emitter of the npn bipolar transistor 241 and a node N4.

The resistor 243b is connected between the power terminal Vcc1 and the output terminal OUTp. In the npn bipolar transistor 242, the collector is connected to the output terminal OUTp, and the base is connected to the input terminal INn. The resistor 245b is connected between the input terminal INn and the bias potential node Vbi. The capacitor 246b is connected between the bias potential node Vbi and the reference potential node. The resistor 244b is connected between the emitter of the npn bipolar transistor 242 and the node N4. The current source resistor 240 is connected between the node N4 and the reference potential node.

When noise signals in phase and with the same amplitude are input to the input terminal INp and INn, the base potentials of the npn bipolar transistors 241 and 242 vary in proportion to the input noise signals. In this state, the emitter potentials of the npn bipolar transistors 241 and 242 also vary in proportion to the input noise signals. Therefore, the current consumption through the current source resistor 240 also varies in proportion to the input noise signals. More specifically, the consumption current flowing in from the power terminal Vcc1 also varies in proportion to the input noise signals. Therefore, A strong correlation exists between the input noise signals and the consumption current flowing in from the power terminal Vcc1.

Referring to FIG. 12, the current consumption detection unit 150a detects the current consumption $I_p$ through the power terminal Vcc1 of the reception circuit 123. The feedback voltage generation unit 152 generates the feedback voltage $V_5$ as the product of the current consumption $I_p$ detected by the current consumption detection unit 150a and the voltage gain Ga.

The voltage gain Ga is a negative constant. The addition unit 153a adds the feedback voltage $V_5$ to the reception voltage $V_{rp}$ and outputs the reception voltage $V_{1p}$ to the input terminal INp. The addition unit 153b adds the feedback voltage $V_5$ to the reception voltage $V_{rn}$ and outputs the reception voltage $V_{1n}$ to the input terminal INn.

Like the first and the second exemplary embodiments, the present exemplary embodiment can achieve an effect of reducing spatial noise.

Figure 15:
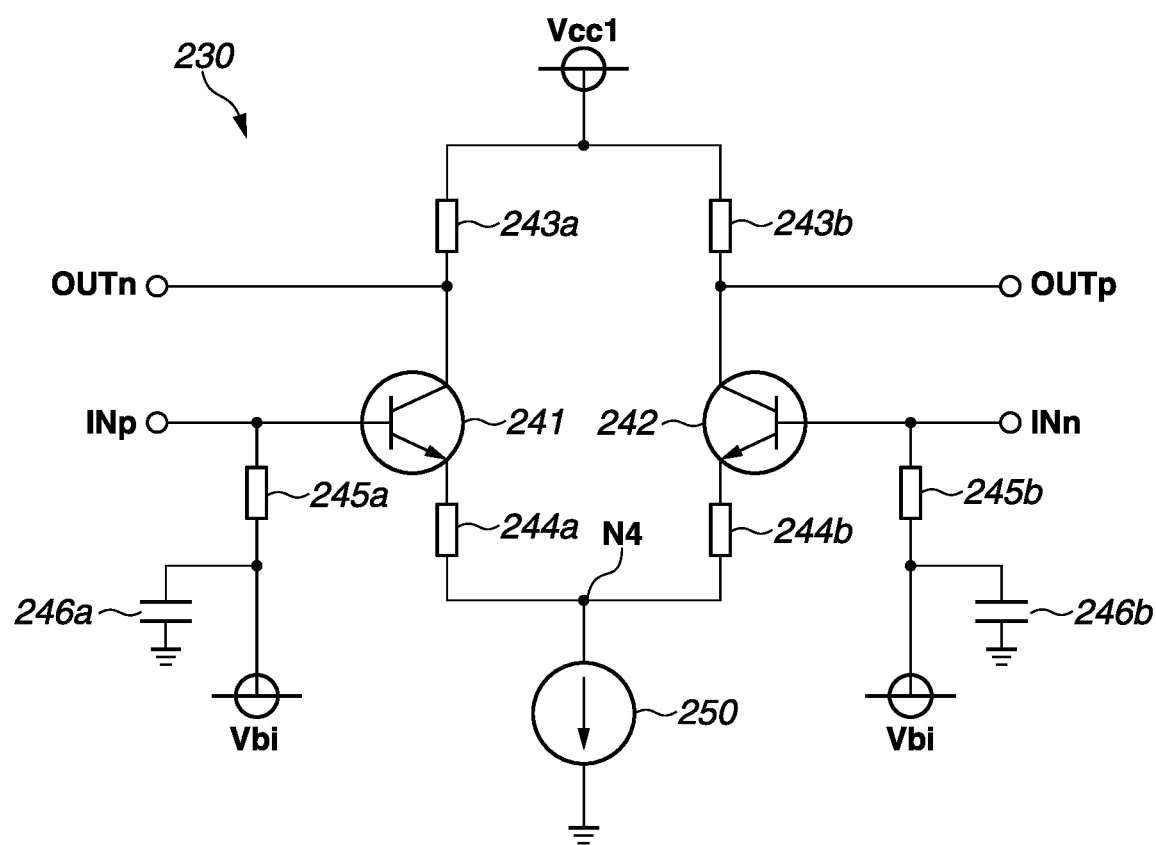
FIG. 15 illustrates another example configuration of the differential amplifier.

FIG. 15 is a circuit diagram illustrating another example configuration of the differential amplifier 230 in FIG. 13. Referring to FIG. 15, the current source resistor 240 in FIG. 14 is replaced with a current source 250. The current source 250 is connected between the node N4 and the reference potential node. $I_n$ this case, there is no correlation between the input noise signals and the consumption current flowing in from the power terminal Vcc1.

Therefore, when the differential amplifier 230 in FIG. 15 is used for the reception unit 120 in FIG. 12, it is difficult in principle to obtain an effect of reducing the noise voltage. However, when the differential amplifier 230 in FIG. 15 is actually produced, it is not possible to achieve ideal performances related to individual variations of the current source 250, the frequency characteristics thereof, and the voltage dynamic range of allowable common-mode noise. Therefore, when the differential amplifier 230 in FIG. 15 is used for the reception unit 120 in FIG. 12, a certain effect of noise reduction can be expected.

As described above, the reception circuit 123 includes the differential amplifier 230. The differential amplifier 230 amplifies the difference between the reception signals of the input terminals INp and INn. Like the reception unit 120 in FIG. 7, the electrodes 121a and 121b are connected to the input terminals INp and INn of the differential amplifier 230, respectively. The feedback voltage generation unit 152 controls the reception signals of the input terminals INp and INn according to the current consumption of the differential amplifier 230.

According to the present exemplary embodiment, the reception unit 120 can control spatial noise components in the reception signals like the first and the second exemplary embodiments.

Figure 16:
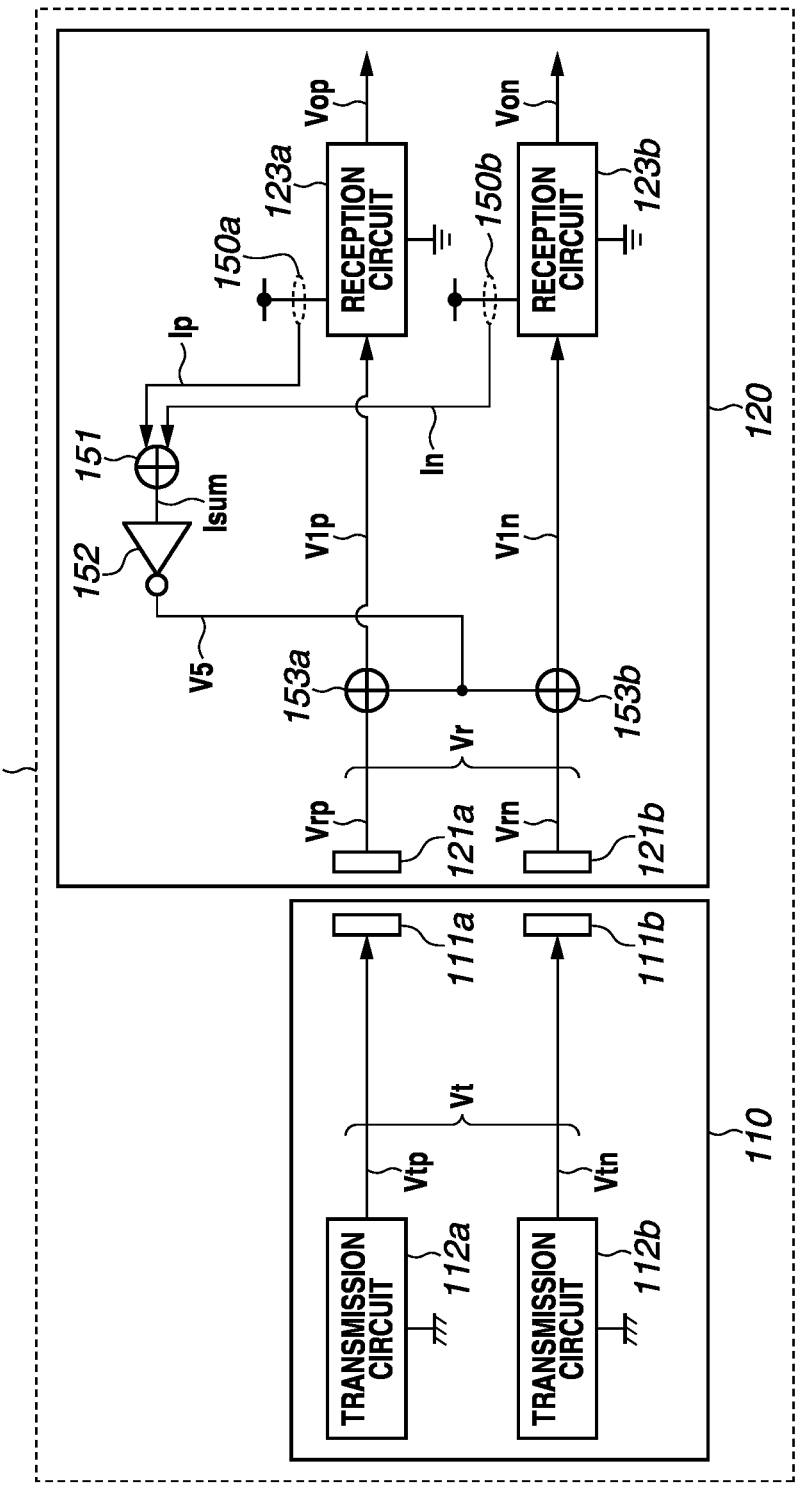
FIG. 16 is yet another block diagram illustrating an example configuration of the communication system.

FIG. 16 is a block diagram illustrating an example configuration of the communication system 100 according to a fourth exemplary embodiment. Referring to FIG. 16, the transmission circuit 112 in FIG. 5 is replaced with two different transmission circuits 112a and 112b, and the reception circuit 123 in FIG. 5 is replaced with two different reception circuits 123a and 123b. The transmission circuits 112a and 112b are independent of each other. The reception circuits 123a and 123b are independent of each other.

The transmission circuit 112a outputs the transmission voltage $V_t$ to the electrode 111a. The transmission circuit 112b outputs the transmission voltage $V_{tp}$ to the electrode 111b. The reception circuit 123a amplifies the reception voltage $V_{1p}$ and outputs the output voltage $V_{op}$. The reception circuit 123b amplifies the reception voltage $V_{1n}$ and outputs the output voltage $V_{on}$. The current consumption detection unit 150a detects the current consumption $I_p$ through the power terminal of the reception circuit 123a. The current consumption detection unit 150b detects the current consumption Ii, through the power terminal of the reception circuit 123b. $I_n$ other aspects, the communication system 100 in FIG. 16 is similar to the communication system 100 in FIG. 5.

When the following first and second conditions are satisfied, the communication system 100 in FIG. 16 can obtain an effect of restricting the noise voltage like the first to third exemplary embodiments.

First condition: The transmission voltages $V_{tp}$ and $V_t$r output by the transmission circuits 112a and 112b, respectively, are random signals having a low correlation.

Second condition: The electrodes 111a, 111b, 121a, and 121b are disposed at distances sufficiently short with respect to the wavelength (frequency) of the noise voltage. The electrodes 121a and 121b contain spatial noise (noise voltage) approximately in phase and with approximately the same amplitude.

Alternatively, the communication system 100 in FIG. 16 can also obtain an effect of restricting the noise voltage when the following third and fourth conditions are satisfied.

Third condition: The transmission voltages $V_{tp}$ and $V_{tn}$ output by the transmission circuits 112a and 112b, respectively, form a pair of differential signals.

Fourth condition: The electrodes 111a, 111b, 121a, and 121b are disposed at distances sufficiently short with respect to the wavelength (frequency) of the noise voltage. The electrodes 121a and 121b contain spatial noise (noise voltage) approximately in phase and with approximately the same amplitude.

According to the present disclosure, the receive signals can be fit into the input dynamic ranges of the reception circuits, even if noise occurs.

Each of the above-described exemplary embodiments is to be considered as illustrative in embodying the present disclosure, and is not to be interpreted as restrictive on the technical scope of the present disclosure. The disclosure may be embodied in diverse forms without departing from the technical concepts or essential characteristics thereof.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-080425, filed May 16, 2022, which is hereby incorporated by reference herein in its entirety.

What is claimed is:

1. A reception apparatus comprising:
   a reception circuit configured to receive reception signals; and
   a control circuit configured to control the reception signals to be input to the reception circuit by executing a feedback control according to a current consumption of the reception circuit,
   wherein the control circuit generates a feedback signal according to the current consumption of the reception circuit,
   wherein the reception circuit receives signals as sums of the reception signals and the feedback signal, and
   wherein the feedback signal is a signal as a product of the current consumption of the reception circuit and a negative coefficient.

2. The reception apparatus according to claim 1, wherein the control circuit controls the reception signals to be input to the reception circuit so that the reception signals fit into an input dynamic range of the reception circuit.

3. The reception apparatus according to claim 1, wherein the control circuit restricts noise components in the reception signals to be input to the reception circuit according to the current consumption of the reception circuit.

4. The reception apparatus according to claim 1, further comprising a first electrode for receiving a reception signal, wherein the first electrode is connected to an input terminal of the reception circuit.

5. The reception apparatus according to claim 4, wherein the first electrode receives the reception signal through electric field or magnetic field coupling.

6. A communication system comprising:
the reception apparatus according to claim 5; and
a transmission apparatus configured to transmit a signal to the reception apparatus,
wherein the transmission apparatus comprises a third electrode coupled to the first electrode through electric field or magnetic field.

7. The reception apparatus according to claim 1, wherein the reception circuit amplifies the input reception signals or subjects the signals to an impedance transformation.

8. The reception apparatus according to claim 1, wherein the control circuit comprises a common collector amplifier circuit or a common base amplifier circuit for amplifying the feedback signal.

9. The reception apparatus according to claim 1, wherein the control circuit generates the feedback signal through digital signal processing.

10. The reception apparatus according to claim 1, wherein a current consumed by the reception circuit is a current flowing to a power terminal of the reception circuit.

11. A reception apparatus comprising:
a reception circuit configured to receive reception signals; and
a control circuit configured to control the reception signals to be input to the reception circuit by executing a feedback control according to a current consumption of the reception circuit,
wherein the reception circuit comprises:
a first amplifier configured to amplify a first reception signal; and
a second amplifier configured to amplify a second reception signal, and
wherein the control circuit controls the first and second reception signals according to a sum of current consumptions of the first and second amplifiers.

12. The reception apparatus according to claim 11, wherein the first and second reception signals are differential signals.

13. The reception apparatus according to claim 11, further comprising:
a first electrode configured to receive the first reception signal; and
a second electrode configured to receive the second reception signal,
wherein the first electrode is connected to an input terminal of the first amplifier, and
wherein the second electrode is connected to an input terminal of the second amplifier.

14. The reception apparatus according to claim 11, wherein a current consumed by the first amplifier is a current flowing to a power terminal of the first amplifier, and a current consumed by the second amplifier is a current flowing to a power terminal of the second amplifier.

15. A reception apparatus comprising:
a reception circuit configured to receive reception signals;
a control circuit configured to control the reception signals to be input to the reception circuit by executing a feedback control according to a current consumption of the reception circuit; and
a differential amplifier configured to amplify a difference between a first reception signal and a second reception signal, wherein the control circuit controls the first and second reception signals according to a current consumption of the differential amplifier.

16. The reception apparatus according to claim 15, further comprising:
a first electrode configured to receive the first reception signal; and
a second electrode configured to receive the second reception signal,
wherein the first and second electrodes are connected to a first input terminal and a second input terminal of the differential amplifier, respectively.

* * * * *